US011427089B2

(12) United States Patent
Lee

(10) Patent No.: US 11,427,089 B2
(45) Date of Patent: Aug. 30, 2022

(54) ELECTRIC AXLE WITH RING GEAR DISCONNECT CLUTCH

(71) Applicant: SCHAEFFLER TECHNOLOGIES AG & CO. KG, Herzogenaurach (DE)

(72) Inventor: Brian Lee, York, SC (US)

(73) Assignee: Schaeffler Technologies AG & CO. KG, Herzogenaurach (DE)

(*) Notice: Subject to any disclaimer, the term of this patent is extended or adjusted under 35 U.S.C. 154(b) by 701 days.

(21) Appl. No.: 16/376,125

(22) Filed: Apr. 5, 2019

(65) Prior Publication Data
US 2020/0317064 A1 Oct. 8, 2020

(51) Int. Cl.
B60K 17/356 (2006.01)
F16D 11/16 (2006.01)
B60L 15/20 (2006.01)
F16H 48/42 (2012.01)
F16H 3/72 (2006.01)
F16D 11/00 (2006.01)
B60K 23/08 (2006.01)

(52) U.S. Cl.
CPC ........ B60L 15/2036 (2013.01); B60K 17/356 (2013.01); F16D 11/16 (2013.01); F16H 3/724 (2013.01); F16H 3/727 (2013.01); F16H 48/42 (2013.01); B60K 2023/0858 (2013.01); F16D 2011/004 (2013.01); F16H 2200/0021 (2013.01)

(58) Field of Classification Search
CPC ........ B60K 2001/001; B60K 1/00–102; B60K 17/16; B60K 17/12; B60K 17/165; F16D 11/14; F16D 2023/123
See application file for complete search history.

(56) References Cited

U.S. PATENT DOCUMENTS

| 9,657,825 B2 | 5/2017 | Ohmura et al. | |
| 2007/0072725 A1* | 3/2007 | Bucknor | F16H 3/728 475/5 |
| 2008/0167782 A1* | 7/2008 | Belmont | B60K 6/387 701/53 |
| 2011/0015021 A1* | 1/2011 | Maguire | B60K 6/445 475/8 |

FOREIGN PATENT DOCUMENTS

DE 102015225629 A1 * 6/2017 ............. F16D 23/12

* cited by examiner

Primary Examiner — Ernesto A Suarez
Assistant Examiner — Lillian T Nguyen

(57) ABSTRACT

An electric axle is configured to selectively enable an electric motor to power a pair of drive shafts of a vehicle. The electric axle includes a planetary gearset configured to drivably couple an electric motor with first and second drive shafts coaxially arranged. The planetary gearset including a ring gear. A housing at least partially surrounds the planetary gearset and is configured to be grounded to the vehicle. A clutch is configured to selectively ground the ring gear with the housing to enable an electric motor to power the first and second drive shafts. The electric axle may include a second planetary gearset, namely a differential planetary gearset. The differential planetary gearset may include a carrier that is shared or common amongst the planetary gearset and the differential planetary gearset.

20 Claims, 4 Drawing Sheets

ELECTRIC AXLE WITH RING GEAR DISCONNECT CLUTCH

TECHNICAL FIELD

The present disclosure relates to an electric axle ("e-axle") equipped with a clutch for selectively enabling an electric motor to power wheels associated with that axle.

BACKGROUND

Electric motors are increasingly used as sources of drive power in vehicles to provide alternatives to conventional internal combustion engines that require fossil fuels. Considerable efforts have already been made to improve the suitability of electric motors in all-electric or hybrid vehicles.

Electric axles, also referred to as e-axles or eAxles, are known in the art to transmit drive torque from the electric motor to an output, and optionally via step down or step up drive gearings. For example, a planetary gearset can be provided for transferring torque from the electric motor to one or more axles while enabling a rotor of the electric motor to spin at a different speed than the axle due to the operation of the planetary gearing.

SUMMARY

In one embodiment, an electric axle is configured to selectively enable an electric motor to power a pair of drive shafts of a vehicle. The electric axle includes a planetary gearset configured to drivably couple an electric motor with first and second drive shafts coaxially arranged, the planetary gearset including a ring gear. A housing at least partially surrounds the planetary gearset and is configured to be grounded to the vehicle. A clutch is configured to selectively ground the ring gear with the housing to enable an electric motor to power the first and second drive shafts.

The electric axle may include a second planetary gearset, namely a differential planetary gearset. The differential planetary gearset may include a carrier that is shared or common amongst the planetary gearset and the differential planetary gearset.

In another embodiment, an e-axle for first and second drive shafts is provided. The e-axle includes a housing, and a planetary gearset disposed at least partially within the housing, the planetary gear set including a ring gear rotatable within the housing and a carrier. A differential planetary gearset includes the carrier such that the carrier is integrated into both the planetary gearset and the differential planetary gearset. A motor is configured to transmit torque to the planetary gearset. A dog clutch is configured to selectively ground the ring gear to the housing to enable the motor to power the first and second drive shafts via the planetary gearset.

In yet another embodiment, an electric axle for a vehicle includes a housing, a motor disposed within the housing, and a planetary gearset including a sun gear engaged with a rotor shaft of the motor. The planetary gearset also includes planet gears and a ring gear. A differential planetary gearset shares a common gear with the planetary gearset. A disconnect clutch is configured to selectively non-rotatably connect the ring gear to the housing, the disconnect clutch includes a clutch plate. An actuator includes an actuator plate coupled to the clutch plate. The disconnect clutch is operable in (i) a disengaged mode in which the clutch plate is axially spaced from the ring gear, the ring gear is able to rotate freely relative to the housing, and torque is not transmitted the through the planetary gearset, and (ii) an engaged mode in which the actuator plate forces the clutch plate to engage the ring gear, the ring gear is non-rotatably fixed to the housing, and torque is able to transmit through the planetary gearset.

BRIEF DESCRIPTION OF THE DRAWINGS

FIG. 4A shows the clutch in a disengaged or unlocked mode, and FIG. 4B shows the clutch in an engaged or locked mode, according to one embodiment.

DETAILED DESCRIPTION

Figure 1:
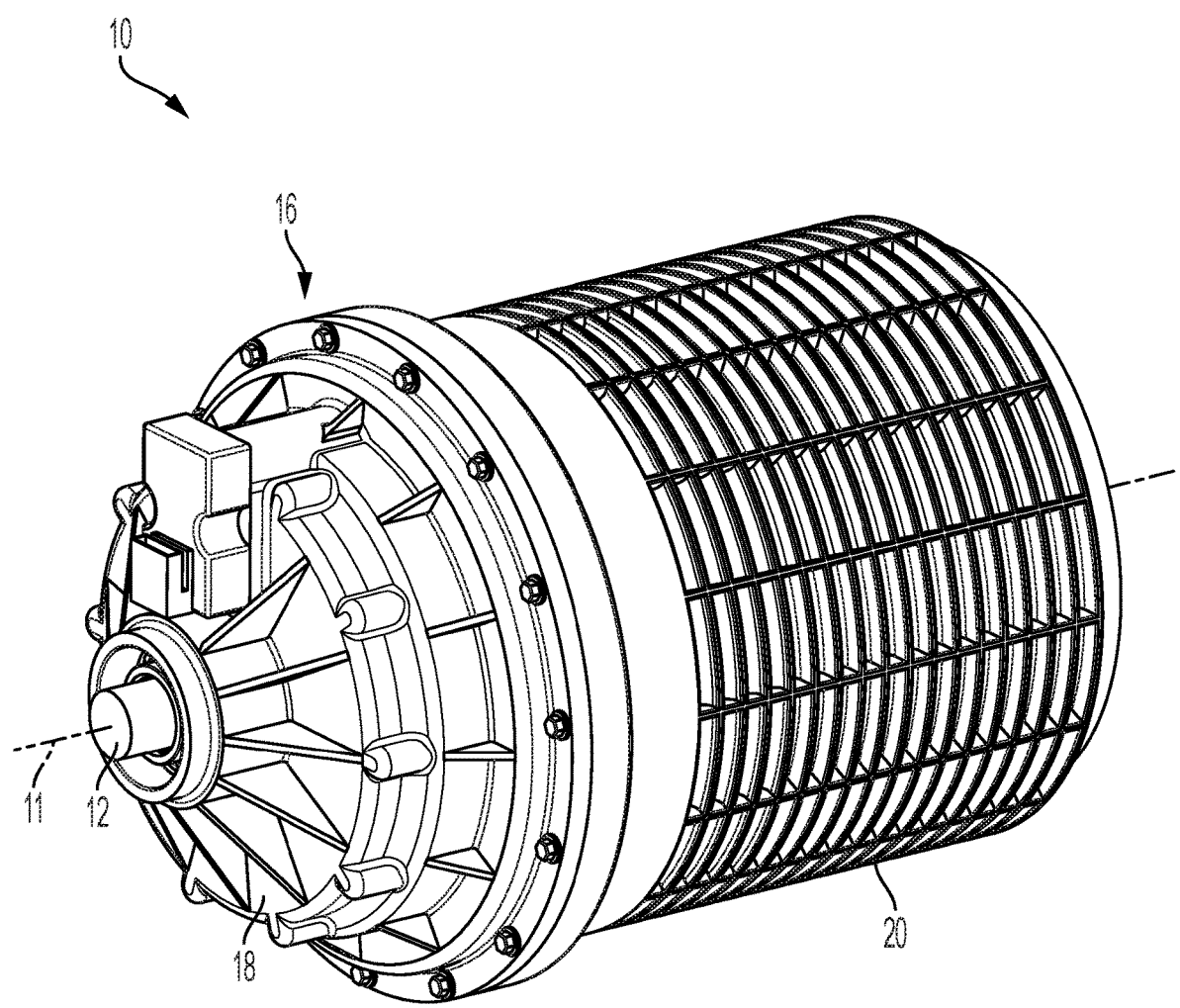
FIG. 1 is a perspective view of an assembled electric axle assembly, or c-axle, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

In hybrid electric vehicles, electric-only vehicles, and the like, the vehicle is at least partially driven by an electric motor. The electric motor may be powered by a high-voltage battery pack, for example, and may be capable of performing regenerative braking to convert the vehicle's kinetic energy into electric energy for storage in the battery.

Electric axles (also referred to as e-axles, eAxles, electronic axles, or the like) can be situated on a drive shaft assembly of the vehicle. The electric axle can function as a differential, allowing the drive shafts to assume different rotational speeds when, for example, the vehicle is turning.

The electric axle can also transfer power from the motor to the drive shafts via step-up or stop-down gearing arrangements.

According to embodiments described herein, an electric axle is provided with a planetary gearset having a ring gear, and a disconnect clutch that selectively engages or grounds the ring gear. When the clutch is open or disengaged, the motor is unable to power the drive shafts, in this mode, the wheels on those drive shafts can rotate passively as the vehicle is traveling. When the clutch is closed or engaged, the ring gear is grounded, which enables torque from the electric motor to transfer to the drive shafts through the planetary gearset. In particular embodiments described herein, the clutch includes a dog clutch plate that transfers axially to engage the ring gear. The dog clutch plate may be non-rotatably fixed to the housing, but able to transmit axially within the housing. When actuated to engage the ring gear, the ring gear becomes connected or grounded with the housing, enabling torque to transmit from the electric motor and to the drive shafts, or vice versa.

Figure 2:
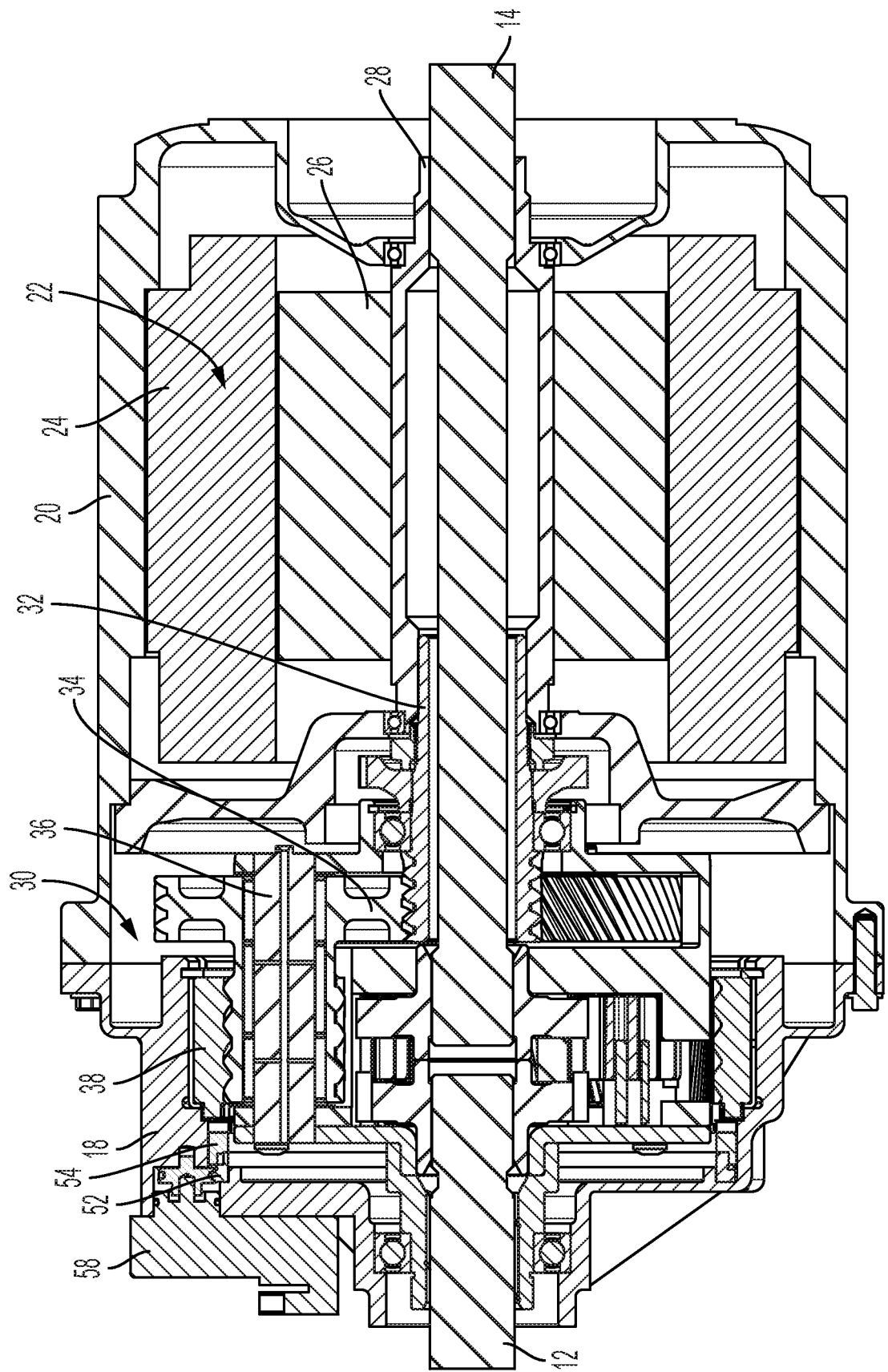
FIG. 2 is a cross-sectional view of the e-axle of FIG. 1, according to one embodiment.
Figure 3:
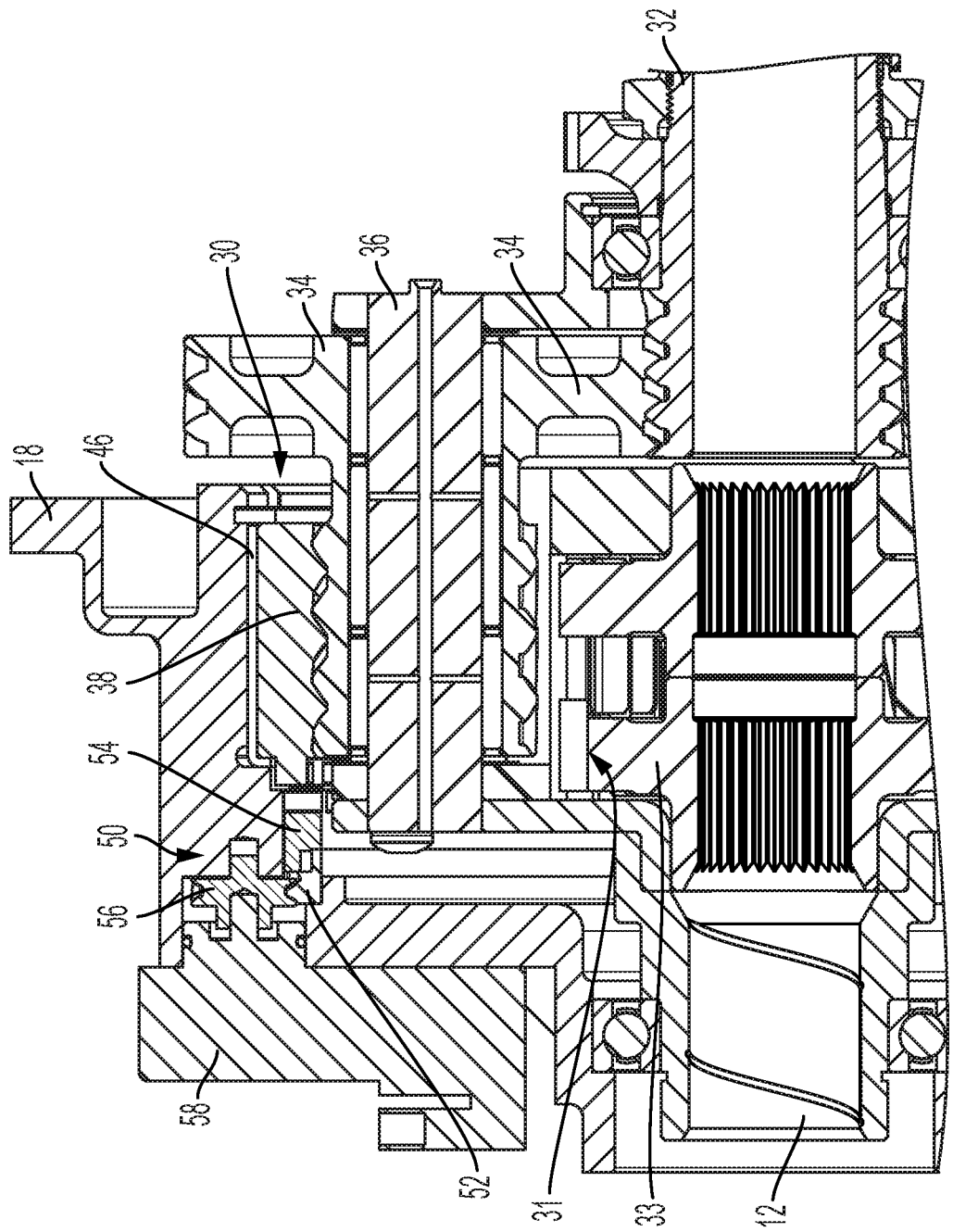
FIG. 3 is an enlarged view of a portion of FIG. 2, focusing on a clutch at a ring gear of the c-axle, according to one embodiment.

The arrangements described below are but one embodiment of a disconnect clutch in an electric axle. This disclosure fully incorporates the teachings of U.S. patent application Ser. No. 16/376,153 by reference herein, which further disclose embodiments for a disconnect clutch in an electric axle. The teachings of this disclosure and that of U.S. patent application Ser. No. 16/376,153 can be combined to form additional embodiments FIG. 1 illustrates an assembled electric axle assembly, or electric axle 10. FIG. 2 shows a cross-sectional view of the electric axle 10, and FIG. 3 shows an enlarged cross-sectional view of a portion of the electric axle 10. The electric axle 10 is disposed about a central axis 11, and about a pair of drive shafts, such as a first drive shaft 12 and a second drive shaft 14. Each of the drive shafts 12, 14 are configured to rotate about the axis 11 to rotate a corresponding wheel (not shown). An outer housing 16 is provided, and may include a first housing shell 18 and a second housing shell 20.

Housed within the second housing shell 20 is an electric motor 22. The electric motor 22 may be powered by a high-voltage battery (not shown) such that the motor is configured to power the drive shafts 12, 14. The motor 22 may include a stator 24, and a rotor 26 with a corresponding rotor shaft 28 that are configured to rotate relative to the stator 24 about the axis 11 when powered. The rotor shaft 28 is rotatably coupled to the second housing shell 20, such that the rotor 26 can rotate within the housing 16 while the housing 16 remains fixed or grounded during operation.

The electric axle 10 includes a planetary gearset 30. In one embodiment, the planetary gearset 30 includes a sun gear 32 non-rotatably coupled to the rotor shaft 28 (e.g., via a spline), for example. The sun gear 32 is coupled to planet gears 34 with a meshing engagement. This allows the planet gears 34 to rotate about each of their own central axis while collectively rotating about the sun gear 32. A carrier 36 supports the planet gears 34. The planet gears 34 are also connected to a ring gear 38 in a meshing engagement such that the planet gears 34 can rotate within (and relative to) the ring gear 38. A second planetary gearset (also referred to as a differential planetary gearset) 31 is also provided, including a differential sun gear 33. The carrier 36 may be an integral carrier of both the planetary gearset 30 and the differential planetary gearset 31. Therefore, the carrier 36 acts as both the output of the planetary gearset 30 and the input of the differential planetary gearset 31. A bushing or bearing 46 may be provided radially between the ring gear 38 and the housing 18. This enables the ring gear 38 to rotate relative to the housing 18 when the clutch is open or disengaged.

As mentioned, the electric axle 10 also includes a differential sun gear 33. There may be a pair of opposing sun gears. For example, a first differential sun gear 33 may be disposed about the shaft 12, while a second differential sun gear may be disposed about the shaft 14. Each differential sun gear may be splined or otherwise non-rotatably connected to the respective shaft 12, 14.

A clutch assembly or clutch 50 is also provided for selectively grounding the ring gear 38 or, in other words, selectively non-rotatably fixing the ring gear 38 with the housing 18. In one embodiment, the clutch 50 includes a pair of plates, namely a ramped plate 52 (also referred to as an actuator plate) and a dog clutch plate 54. These plates are merely exemplary and can be other types of clutch plates or clutch members configured for grounding the ring gear 38.

In one embodiment, the ramped plate 52 is an annular plate configured for rotation about the axis 11. A pinion gear 56 is powered by an electric motor 58 for rotation. The electric motor 58 may be an accessory motor, and not a high-voltage motor for driving the vehicle. The motor 58 may be connected to an associated controller or microprocessor such that it can be powered on command. In response to a command to energize the motor 58, the motor 58 turns the pinion gear 56, which turns the ramped plate 52 via a meshing engagement, for example. The motor 58, pinion gear 56, and ramped plate 52 can collectively be referred to as an actuator or actuator assembly that is configured to actuate the clutch, e.g., the interaction between the dog clutch member 54 and the ring gear 38.

Rotation of the ramped plate 52 can cause axial displacement or translation of the dog clutch plate 54. For example, the ramped plate 52 may have a surface that changes in thickness along a circumferential direction of the plate. This surface can include a threading, or configured like a threading such that rotation of the plate 52 causes axial displacement of the dog clutch plate 54. As the ramped plate 52 is rotated, an increasingly thicker portion of the ramped plate 52 contacts the dog clutch plate 54, causing the dog clutch plate 54 to be moved in the axial direction. The dog clutch plate 54 may be non-rotatably fixed to the housing 18 while still able to translate axially relative to the housing 18. This can be performed with a spline connection, for example.

Figure 4A:
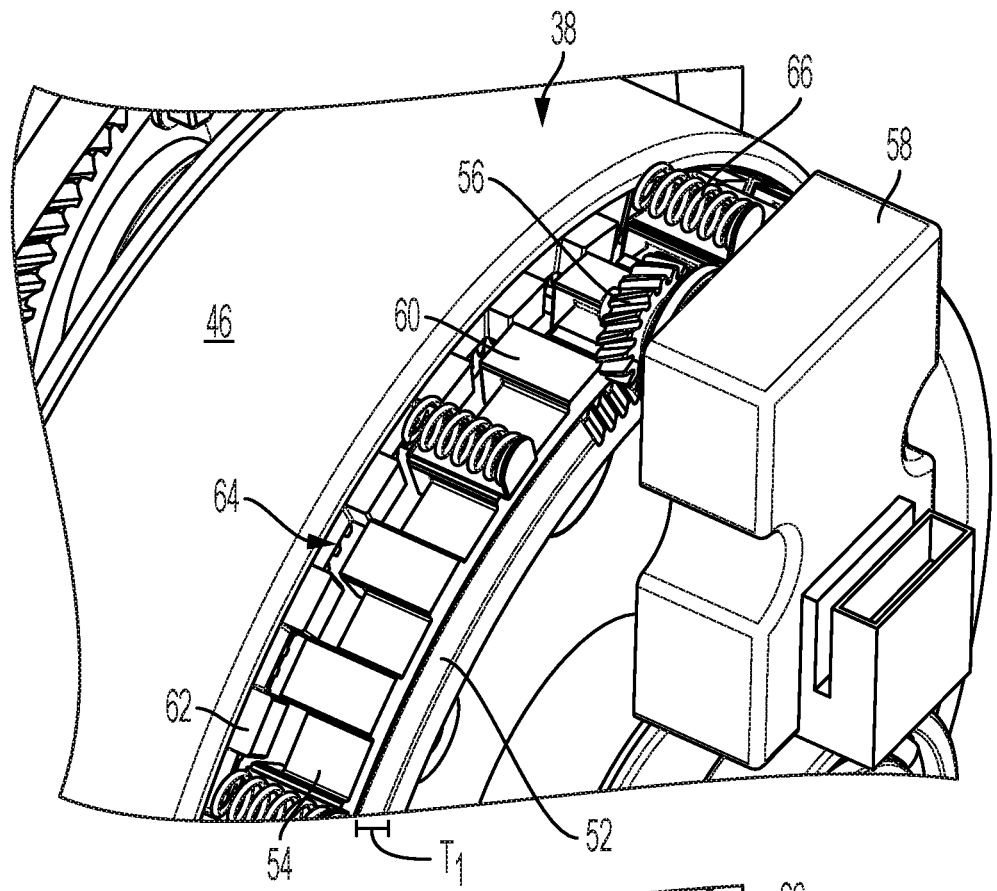
FIGS. 4A-4B are perspective views of the disconnect clutch with an outer housing removed for illustrative purposes.
Figure 4B:
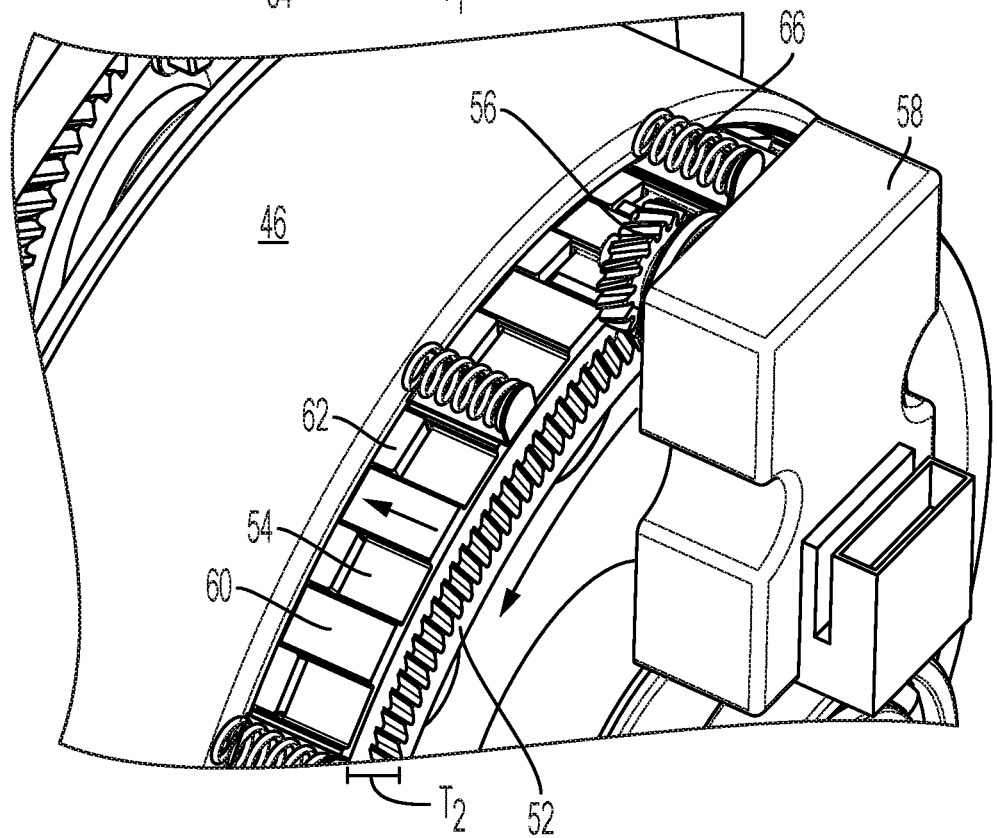

FIGS. 4A-4B show engagement and operation of the clutch 50, in which FIG. 4A shows the clutch 50 in an open or disengaged mode, and FIG. 4B shows the clutch 50 in a closed or engaged mode. As can be seen, the ramped plate 52 has an axial thickness that varies along the circumference of the ramped plate 52. For example, in the disengaged mode of FIG. 4A the ramped plate 52 may have a first thickness $T_1$, and in the engaged mode of FIG. 4B the ramped plate 52 may have a second thickness $T_2$ that exceeds the first thickness at the same circumferential location of the dog clutch plate 54. The dog clutch plate 54 may have a corresponding ramped surface that engages the ramped surface of the ramped plate 54 such that rotation of the ramped plate 54 alters the location of engagement between the two plates 52, 54 and presses the dog clutch plate 54 in the axial direction.

In one embodiment, the pinion gear 56 is turned by the motor 58, which correspondingly rotates the ramped plate 52, indicated by an arrow. The thickness of the ramped plate 52 forces the dog clutch plate 54 in the axial direction, indicated by another arrow. The dog clutch plate 54 can have a plurality of teeth 60 on one axial side that engage with the ring gear when the clutch 50 is activated for engagement. The teeth 60 extend in the axial direction. The ring gear 38 may have corresponding teeth 62 separated by pockets 64 between adjacent teeth 62. Each pocket 64 is sized and configured to receive a respective one of the teeth 60 of the dog clutch plate 54. This non-rotatably couples the dog clutch plate 54 with the ring gear 38 when the teeth 60 are pressed into engagement within the pockets 64. And, since the dog clutch plate 54 is non-rotatably coupled to the housing 18, this grounds the ring gear 38. Grounding of the ring gear 38 allows torque to flow through the planetary gearset and into the drive shafts 12, 14.

Springs 66 are provided to force the dog clutch plate 54 to return to the disengaged position i.e., spaced from the ring gear 38) when the electric motor 58 is deactivated.

In short, an e-axle is provided with a planetary gearset, which includes a ring gear. A disconnect clutch selectively grounds the ring gear, e.g., selectively non-rotatably fixes the ring gear to a housing. When the ring gear is grounded, torque can transmit through the planetary gearset, allowing the larger electric motor to power axle shafts. The electric motor can than provide drive power to propel the vehicle. When the clutch is commanded to disengage, the ring gear is disconnected from the housing and is able to rotate relative to the housing. This prevents any torque from transferring through the planetary gearset. Thus, any power supplied by the electric motor will not be transferred through the planetary gearset and to the axle shafts. The electric motor can be shut off, and the wheels on that axle can passively rotate as the vehicle travels, rather than actively propelling the vehicle.

Moreover, a planetary gearset works in conjunction with a differential planetary gearset. A single carrier may be part of or integrated with both planetary gearsets. When the ring gear is grounded or coupled to the housing via the clutch, the carrier can output torque from the planetary gearset and input torque into the differential planetary gearset.

While a mechanical activation of the clutch with an electric motor, pinion gear, etc. is described above, it should be understood that other forms of activating the dog clutch plate are contemplated. For example, hydraulics can be utilized in which pressurized fluid causes the dog clutch plate to transfer axially and engage the ring gear.

As explained above, the motor 58 may be connected to a controller for operation and control of the motor and the clutch. The controller may be housed within the housing of the motor 58, or may be external to the motor housing. The controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the processor, to cause the controller to activate or excite the electric motor, and correspondingly to implement functions, features, and processes of the clutch described herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 electric axle
11 central axis
12 first drive shaft
14 second drive shaft
16 outer housing
18 first housing shell
20 second housing shell
22 electric motor
24 stator
26 rotor
28 rotor shaft
30 planetary gearset
31 differential planetary gearset
32 sun gear
33 differential sun gear
34 planet gears
36 carrier
38 ring gear 46 bushing or bearing
50 clutch assembly
52 ramped plate
54 dog clutch plate
56 pinion gear
58 electric motor
60 teeth
62 teeth
64 pocket
66 spring

What is claimed is:

1. An electric axle configured to selectively enable an electric motor to power a pair of drive shafts of a vehicle, the electric axle comprising:
    a planetary gearset configured to drivably couple the electric motor with first and second drive shafts coaxially arranged, the planetary gearset including a ring gear;
    a housing at least partially surrounding the planetary gear set and configured to be grounded to the vehicle;
    a clutch configured to selectively ground the ring gear with the housing to enable an electric motor to power the first and second drive shafts; and
    wherein the clutch includes a first plate and a second plate, wherein the first plate includes a ramp plate with a surface that mates with a corresponding surface of the second plate.

2. The electric axle of claim 1, wherein the first plate is an annular plate rotatable relative to the housing, and the second plate contacts the first plate and configured to transfer axially as the first annular plate rotates.

3. The electric axle of claim 2, wherein the second plate is a dog clutch plate non-rotatably fixed with the housing and axially moveable to engage the ring gear.

4. The electric axle of claim 3, wherein the ramp plate is an annular ramp plate and the surface is ramped or tapered with an increasing thickness such that rotation of the annular ramp plate causes axial movement of the dog clutch plate.

5. The electric axle of claim 4, wherein the surface is threaded.

6. The electric axle of claim 3, further comprising a second electric motor configured to rotate a pinion gear that contacts the first plate, wherein energization of the second electric motor rotates the pinion gear and the first plate to axially translate the second plate.

7. The electric axle of claim 1, further comprising a differential planetary gearset having a carrier that is integrated into both the differential planetary gearset and the planetary gearset.

8. An e-axle for first and second drive shafts, the e-axle comprising:
    a housing;
    a planetary gearset disposed at least partially within the housing, the planetary gear set including a ring gear rotatable within the housing and a carrier;
    a differential planetary gearset including the carrier such that the carrier is integrated into both the planetary gearset and the differential planetary gearset;
    a motor configured to transmit torque to the planetary gearset;
    a dog clutch configured to selectively ground the ring gear to the housing to enable the motor to power the first and second drive shafts via the planetary gearset, and
    a dog clutch actuator including a ramped plate with a surface that mates with a corresponding surface of a dog clutch plate.

9. The e-axle of claim 8, wherein the dog clutch plate is non-rotatably coupled to the housing, wherein the dog clutch plate has teeth extending axially, and wherein the ring gear includes corresponding pockets configured to selectively receive the teeth to non-rotatably couple the dog clutch plate to the ring gear.

10. The e-axle of claim 9, wherein rotation of the ramped plate forces the dog clutch plate to move in an axial direction.

11. The e-axle of claim 8, wherein the dog clutch actuator further includes a pinion gear in meshing engagement with the ramped plate, and an electric motor configured to, when energized, turn the pinion gear.

12. The e-axle of claim 8, wherein the ramped plate includes a thickness that varies along a circumferential direction of the ramped plate.

13. The e-axle of claim 8, wherein the ramped plate is ramped such that it includes a thickness that increases along a circumferential direction, and the dog clutch plate is ramped such that it includes a thickness that increases along the circumferential direction.

14. The e-axle of claim 8, further comprising a return spring biased to separate the dog clutch plate from the ring gear.

15. All electric axle for a vehicle, the electric axle comprising:
    a housing;
    a motor disposed within the housing and having a rotor shaft;
    a planetary gearset including a sun gear engaged with the rotor shaft, planet gears, and a ring gear;
    a differential planetary gearset sharing a common gear with the planetary gearset;
    a disconnect clutch configured to selectively non-rotatably connect the ring gear to the housing, the disconnect clutch including a clutch plate; and
    an actuator including an actuator plate coupled to the clutch plate;
    wherein the disconnect clutch is operable in:
        a disengaged mode in which the clutch plate is axially spaced from the ring gear, the ring gear is able to rotate freely relative to the housing, and torque is not transmitted through the planetary gearset, and
        an engaged mode in which the actuator plate forces the clutch plate to engage the ring gear, the ring gear is non-rotatably fixed to the housing, and torque is able to transmit through the planetary gearset; and
    wherein the actuator includes a ramped plate with a surface that is threaded and mates with a corresponding surface of the clutch plate.

16. The electric axle of claim 15, wherein the actuator plate is coupled to the clutch plate such that rotation of the actuator plate causes linear movement of the clutch plate.

17. The electric axle of claim 15, wherein the clutch plate includes teeth and the ring gear includes pockets configured to receive the teeth when the disconnect clutch is in the engaged mode.

18. The electric axle of claim 15, wherein the actuator plate has an increasing thickness in a circumferential direction, and the clutch plate has an increasing thickness in the circumferential direction.

19. The electric axle of claim 15, wherein the actuator includes a motor configured to selectively rotate the actuator plate.

20. The electric axle of claim 19, wherein the actuator includes a pinion gear in a meshing engagement with an outer surface of the actuator plate and connecting the motor to the actuator plate.

\* \* \* \* \*